(12) United States Patent
Sedeh et al.

(10) Patent No.: US 7,734,442 B2
(45) Date of Patent: *Jun. 8, 2010

(54) APPARATUS AND METHOD FOR A TEST AND MEASUREMENT INSTRUMENT

(75) Inventors: Mehrab S. Sedeh, Beaverton, OR (US); Robert D. Twete, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/108,344

(22) Filed: Apr. 23, 2008

(65) Prior Publication Data

US 2008/0263253 A1  Oct. 23, 2008

Related U.S. Application Data

(60) Provisional application No. 60/913,525, filed on Apr. 23, 2007.

(51) Int. Cl.
*G01R 27/28* (2006.01)
(52) U.S. Cl. ...................................................... 702/117
(58) Field of Classification Search .................. 702/66, 702/67, 117, 118, 121, 187, 189, 190; 714/718, 714/738
See application file for complete search history.

(56) References Cited

U.S. PATENT DOCUMENTS 6,804,632 B2   10/2004  Orenstien et al.
7,076,714 B2 *  7/2006  Cook et al. .................. 714/742
7,571,067 B2    8/2009  Sedeh
7,574,319 B2    8/2009  Sedeh
2008/0262765 A1 10/2008  Sedeh
2008/0262766 A1 10/2008  Sedeh
2008/0262767 A1 10/2008  Sedeh

* cited by examiner

*Primary Examiner*—Drew A Dunn
*Assistant Examiner*—Stephen J Cherry
(74) *Attorney, Agent, or Firm*—Bennett K. Langlotz; Francis I. Gray; Thomas F. Lenihan (57) ABSTRACT

The apparatus for a test and measurement instrument consists of multiple integrated circuits with each integrated circuit being connected to its own memory controller. At least one of the integrated circuits is a specialized integrated circuit, which may be a graphics processing unit, a digital signal processor, or a field-programmable gate array. Each memory controller is connected to its own memory. The integrated circuits are connected in a circular arrangement by multiple high-speed interconnects. A bridge is connected to at least the first and last integrated circuits. A system bus connects the bridge to an acquisition module. The acquisition module has a signal bus interface with the system bus being connected to the acquisition module and having its own acquisition hardware. The acquisition hardware is a direct memory access machine that can transfer data to any portion of the memory. There is a signal source connected to the signal bus interface.

18 Claims, 6 Drawing Sheets

APPARATUS AND METHOD FOR A TEST AND MEASUREMENT INSTRUMENT

CLAIM FOR PRIORITY

The subject application claims priority from U.S. Patent Application Ser. No. 60/913,525, entitled, APPARATUS AND METHODS FOR A TEST AND MEASUREMENT INSTRUMENT EMPLOYING A MULTI-CORE HOST PROCESSOR (Sedeh, et al.), filed 23 Apr. 2007, and assigned to the same assignee as the subject invention. The subject matter of U.S. Patent Application Ser. No. 60/913,525 is herein incorporated by reference in its entirety.

CROSS-REFERENCE TO RELATED CASES

The subject application is related to the following U.S. patent applications, bearing Ser. Nos. 12/051,142, 12/051,163, 12/051,176, 12/051,187, and 12/051,203, all claiming priority from U.S. Patent Application Ser. No. 60/913,525, entitled, APPARATUS AND METHODS FOR A TEST AND MEASUREMENT INSTRUMENT EMPLOYING A MULTI-CORE HOST

FIELD OF THE INVENTION

The present invention relates to an apparatus and method for a test and measurement instrument for use in connection with analyzing waveforms. The apparatus and method for a test and measurement instrument have particular utility in connection with providing a scalable test and measurement instrument capable of handling the acquisition, transfer, analysis, and display of large quantities of waveform data as well as complex waveforms.

BACKGROUND OF THE INVENTION

Apparatuses and methods for a test and measurement instrument are desirable for providing a scalable test and measurement instrument capable of handling the acquisition, transfer, analysis, and display of large quantities of waveform data as well as complex waveforms. Demand for new oscilloscope application features is growing, especially the ability to process ever-greater quantities of waveform data, because signals are becoming increasingly complex. Analyzing complex waveforms generates more intermediate data, which in turn requires more system memory access instances.

Most software applications have enjoyed regular performance gains for several decades, even without significant modifications, merely because of increases in computer hardware performance. Central Processing Unit (CPU) manufacturers and, to a lesser degree, memory manufacturers have reliably increased processing speeds and lowered memory access times. However, performance gains through increasing CPU clock speeds are seriously inhibited by heat generation, electron leakage, and other physical limitations, while system memory speeds have historically doubled only every 10 years.

Since major processor manufacturers and architectures can no longer easily boost straight-line instruction throughput, performance gains in test and measurement instruments, such as oscilloscopes, will have to be accomplished in fundamentally different ways. Because CPU manufacturers have adopted dual core and multicore processors to increase performance, oscilloscope applications will have to enable concurrent processing in order to exploit the CPU performance gains that are becoming available. What is therefore needed is a practical apparatus and a realizable method that provides a scalable test and measurement instrument capable of handling large quantities of waveform data as well as complex waveforms.

The use of oscilloscopes is known in the prior art. For example, oscilloscopes currently manufactured by Tektronix, Inc. of Beaverton, Oreg. ship with a single core 3.42 GHz Pentium® processor from Intel. These prior art oscilloscopes cannot have their performance boosted through use of a faster single CPU because CPUs with higher clock speeds do not presently exist. Furthermore, mere replacement of the single core CPU with a dual core or multicore CPU offers minimal benefit because many of the important operations of an oscilloscope application are not CPU constrained. In an instrument that moves and processes a large quantity of data, system memory access times and/or system bus performance often are the instrument's performance bottleneck.

Existing high-end oscilloscopes, such as those currently manufactured by Tektronix, Inc., already incorporate a sizable system memory (2 GB of system RAM is typical). Because of increasing quantities of data to be processed and stored, next-generation oscilloscope architectures will undoubtedly require additional memory. Since increases in main memory speeds are realized infrequently, the time required to access system memory is likely to continue to dominate many applications' performance. Therefore, the addition of a multicore processor to existing oscilloscope architectures provides minimal benefit because system memory cannot provide data as fast as the processors can process it.

Figure 1:
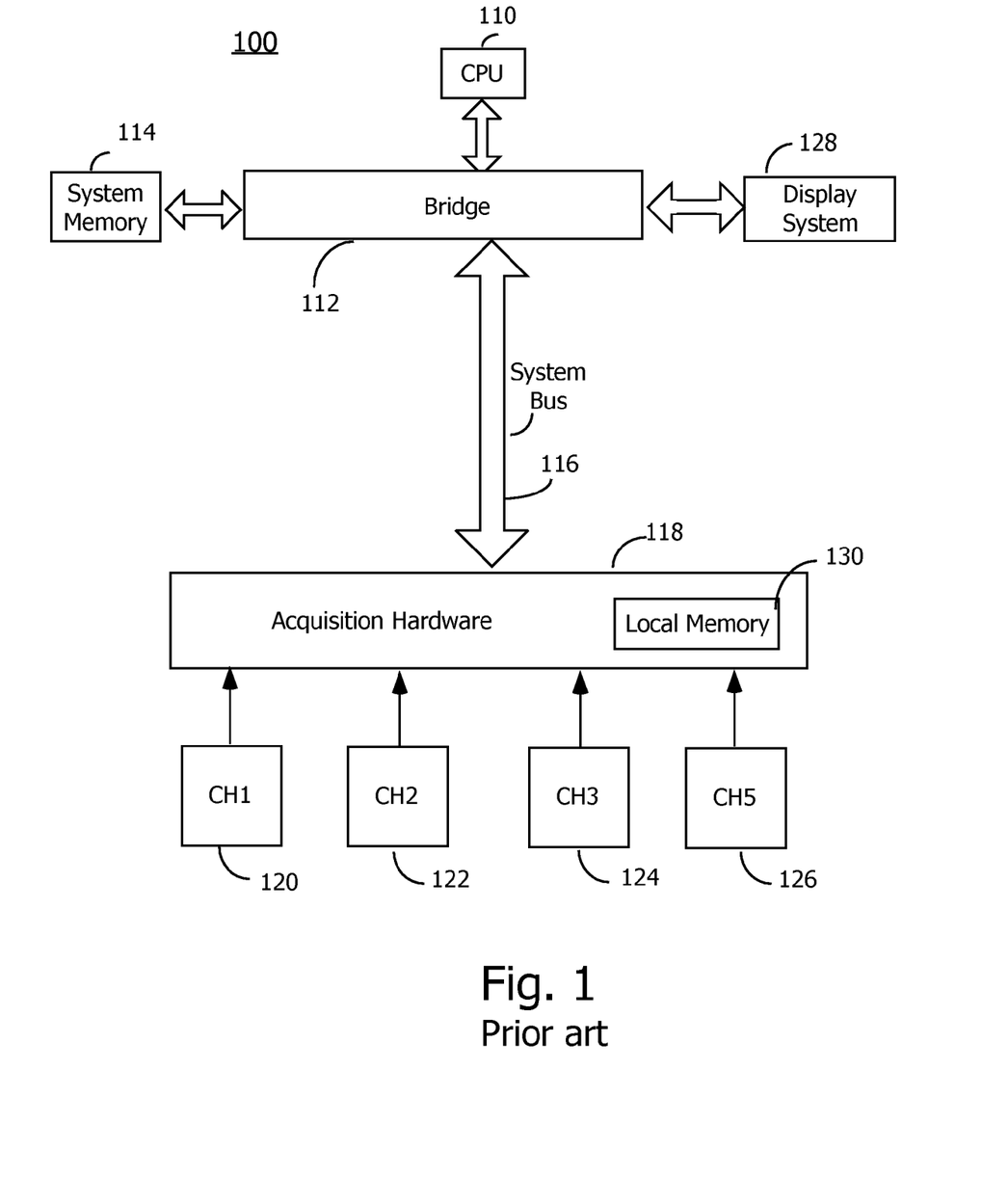
FIG. 1 is a block diagram view of a prior art single CPU oscilloscope architecture.

Furthermore, the data acquisition process is an inherently sequential four-step process presenting additional challenges to the adoption of multicore CPU technology in oscilloscope applications. FIG. 1 depicts a single core processor prior art oscilloscope architecture 100 that acquires and stores waveform data from four channels 120-126 into four data records in the system memory 114. Conventionally, waveforms are stored in the local memory 130 of the acquisition hardware 118 in a first step and subsequently transferred serially to the system memory 114 via a Peripheral Component Interconnect (PCI) or Peripheral Component Interconnect Express (PCIe) system bus 116 and bridge 112 in a second step. The CPU 110 then analyzes the waveform data in a third step and causes the results to be shown on a display screen 128 in a fourth and final step. The acquisition hardware 118 may be embodied in a peripheral device attached to the system bus 116 that is operable by the operating system.

This four-step process is not easily amenable to parallelization. These four subtasks cannot be run at the same time on four CPU cores with this prior art architecture because each must be completed before the next can begin. Nor can these four subtasks be pipelined either. In this context, a pipeline is a set of data processing elements connected in series so that the output of one element is the input of the next one. The elements of a pipeline are often executed in parallel or in a time-sliced fashion. However, because three of the steps require access to the system memory to run and store intermediate data generated as data moves through the pipeline, parallel processing is impossible. Therefore, the inherently sequential nature of the data acquisition process prevents taking full advantage of multicore processor technology.

The system memory also creates a bottleneck because it is used for waveform storage data and shared by several clients, including Analysis, General Purpose Interface Bus, Display, Acquisition, Math, Save/Recall, and Applications. Because these clients must access the data serially from the shared system memory, it is impossible to create parallelism among the clients and run them at the same time. The architecture's data transfer rate and system bandwidth also pose limiting factors, which are likely to worsen. Next-generation real-time data acquisition hardware will have very large record lengths per channel. Existing oscilloscope architectures cannot transfer, analyze, and display that much data in real-time.

Figure 2:
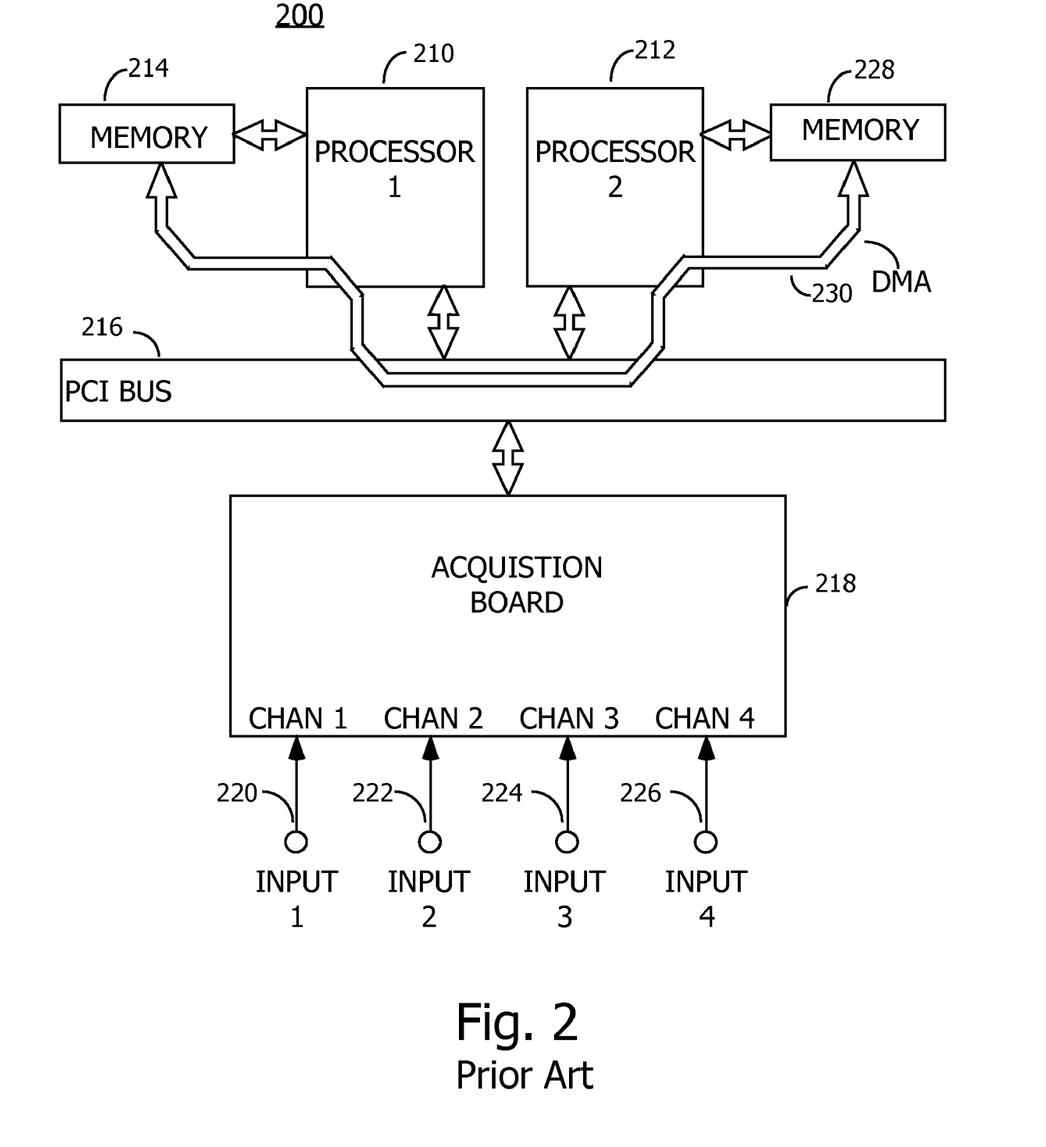
FIG. 2 is a block diagram view of a prior art dual CPU oscilloscope architecture.

An initial prior art attempt to address some of these problems was the TDS7000-series oscilloscope manufactured by Tektronix, Inc. whose architecture 200 is depicted in FIG. 2. This architecture employed a dual core processor 210, 212. Although each processor could access the other's memory 214, 228, this was accomplished using the Direct Memory Access (DMA) 230 process over a PCI bus 216, a relatively slow computer bus. An inability to transfer data sufficiently rapidly to continuously occupy both processors left the oscilloscope unable to take full advantage of the presence of two processors.

Figure 3:
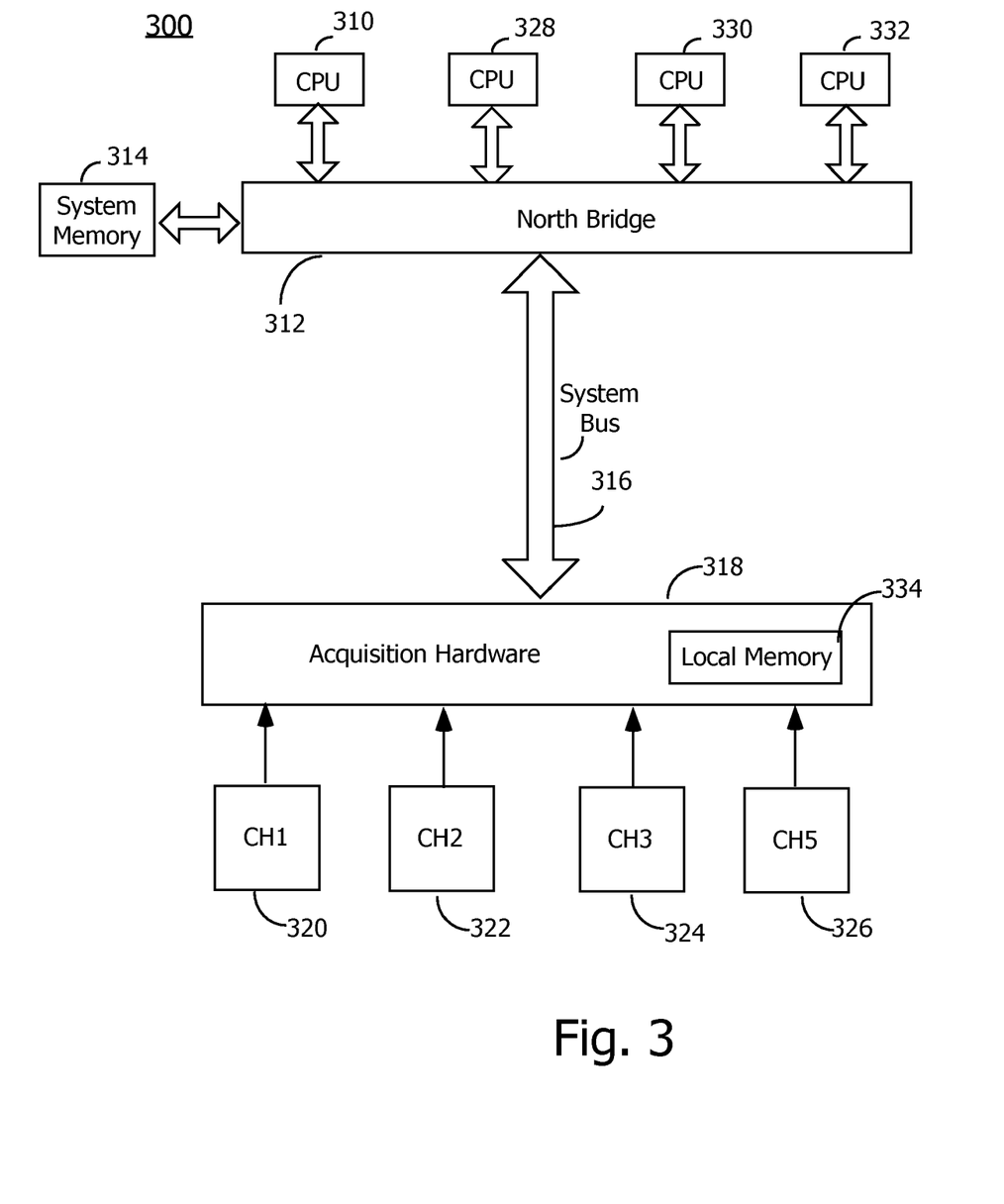
FIG. 3 is a block diagram view of a quad core CPU oscilloscope architecture.

FIG. 3 shows a prior art oscilloscope system architecture employing a quad core CPU 300 developed by one of the inventors (M. Sedeh) of the current invention. A quad core CPU 310, 328, 330, and 332 is the dominant high-performance computer architecture in industry, known as Symmetric Multiprocessor (SMP) architecture. While the SMP architecture performs adequately in many respects, it unfortunately exhibits architectural limitations. In an SMP-based system, all processors access a shared pool of memory 314 over a central memory bus. While this limited the effectiveness of the dual core system depicted in FIG. 2, an even greater problem with memory access occurs when quad core or higher multicore CPUs are utilized. Because the processors are often fighting each other for access to the single memory bus, a serious bottleneck develops. This occurs because the time to move data back and forth between the processors 310, 328, 330, and 332 and the system memory 314 increases. This major bottleneck is especially severe in an instrument like a high-end oscilloscope. High-end oscilloscopes require the movement of large amounts of data and utilize processor-intensive applications that create considerable traffic between the processors 310, 328, 330, and 332 and the system memory 314. Data sets in modern high-end oscilloscopes can be so large that they are not entirely cacheable, resulting in many system memory access instances. This problem with memory access times is aggravated by use of the same system bus and memory bus for Input/Output (I/O) and DMA transfer of waveform data from the acquisition hardware's 318 local memory 334.

Another architectural problem with SMP architecture is that the memory system does not scale up with increasing numbers of processor cores. Memory access occurs via a single memory controller 422 (shown in FIG. 4) for the entire system, no matter how many processor cores 410,412 are present. This serious problem prevents taking full advantage of multicore CPUs because they cannot obtain enough data in a timely fashion to always remain busy because memory is a shared resource. Thus, performance of applications with large memory requirements remains largely constrained by memory access times.

Preliminary performance testing on dual core and quad core high performance oscilloscopes using the architectures depicted in depicted in FIGS. 2 and 3 showed no significant performance gains over single core instruments. The lack of performance gains was not surprising because the prior art data acquisition process is sequential in nature. All processor cores must share the system memory, and applications tend to be highly memory intensive. Because the memory system cannot provide data as fast as the application needs it to keep all of the processor cores busy simultaneously, very little parallel processing can occur, making the additional processor cores only marginally utilized.

Therefore, a need exists for a new and improved apparatus and method for a test and measurement instrument that can be used for providing a scalable test and measurement instrument capable of handling the acquisition, transfer, analysis, and display of large quantities of waveform data as well as complex waveforms. In this regard, the various embodiments of the present invention substantially fulfill at least some of these needs. In this respect, the apparatus and method for a test and measurement instrument according to the present invention substantially departs from the conventional concepts and designs of the prior art, and in doing so provides an apparatus primarily developed for the purpose of providing a scalable test and measurement instrument capable of handling the acquisition, transfer, analysis, and display of large quantities of waveform data as well as complex waveforms.

SUMMARY OF THE INVENTION

The present invention provides an improved apparatus and method for a test and measurement instrument, and overcomes the above-mentioned disadvantages and drawbacks of the prior art. As such, the general purpose of the present invention, which will be described subsequently in greater detail, is to provide an improved apparatus and method for a test and measurement instrument that has all the advantages of the prior art mentioned above.

To attain this, the preferred embodiment of the present invention essentially comprises multiple integrated circuits with each integrated circuit being connected to its own memory controller. At least one of the integrated circuits is a specialized integrated circuit, which may be a graphics processing unit, a digital signal processor, or a field-programmable gate array. Each memory controller is connected to its own memory. The integrated circuits are connected in a circular arrangement by multiple high-speed interconnects. A bridge is connected to at least the first and last integrated circuits. A system bus connects the bridge to an acquisition module. The acquisition module has a signal bus interface with the system bus being connected to the acquisition module and having its own acquisition hardware. The acquisition hardware is a direct memory access machine that can transfer data to any portion of the memory. There is a signal source connected to the signal bus interface. The preferred embodiment of the present invention also essentially comprises the steps of:

obtaining the test and measurement instrument;

attaching the test and measurement instrument to a Device Under Test (DUT) to be measured, wherein the signal source is in electronic communication with the acquisition module;

collecting data from the DUT;

storing the collected data from the DUT in the acquisition memory;

dividing the collected data from the DUT into a plurality of pieces;

assigning one of the plurality of pieces to be processed next;

transferring the piece to be processed next to the memory connected to the first processor;

processing any pieces to be processed by each processor communicating with its own memory to generate intermediate results;

transferring each intermediate result from the processor generating it to the adjacent processor;

repeating steps e) through i) until all of the plurality of pieces created in step d) have been processed at least once by the final processor and the final processor's memory contains a final result; and reporting the final result to a user.

There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention.

Figure 4:
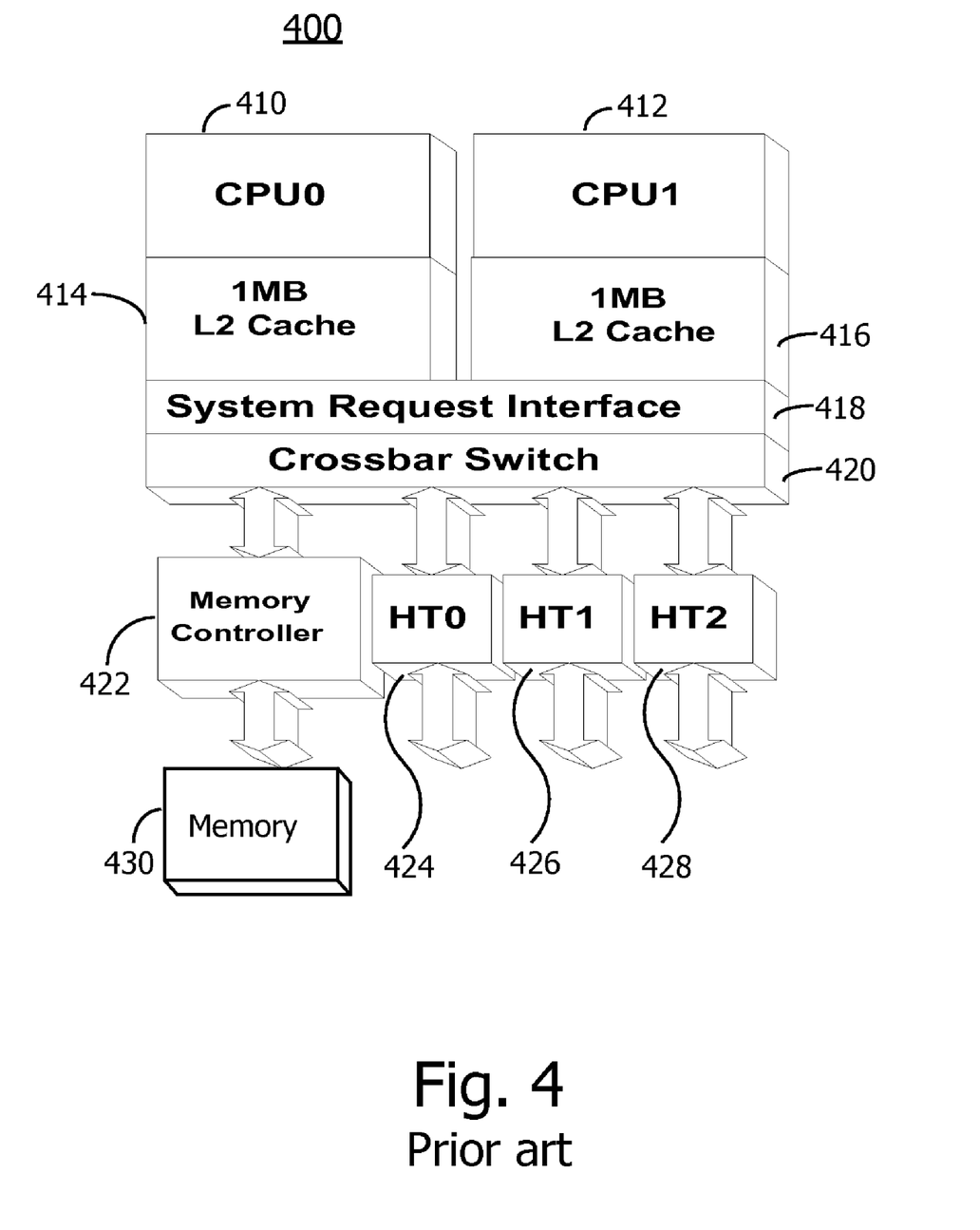
FIG. 4 is a block diagram view of a multicore processor suitable for use with the present invention.

FIG. 4 illustrates the architecture of a prior art multicore processor 400 suitable for use with the present invention. For example, the AMD64 Opteron™ dual core processor, manufactured by AMD Corporation of Sunnyvale, Calif., has a Non-Uniform Memory Access (NUMA) architecture 400 especially suitable for use with the present invention. The design is called non-uniform because memory access times vary depending upon the memory's location. This is because a CPU can access its own local memory 430 faster than it can access another CPU's memory. This design feature gives processor cores 410 and 412 access to their own local memory 430 via memory controller 422. When additional multicore processors 400 are present with their own local memory, the high-speed interconnects 424, 426, and 428 can be used to access their local memory. This architecture enables each processor to access other processors' memory quickly and easily. The high-speed interconnects 424, 426, and 428 also enable communication with the data source channels, while the memory controller 422 also provides access to the system bus. The system request interface 418 and crossbar switch 420 control the physical connections between the CPU cores 410 and 412, the memory controller 422, and the high-speed interconnects 424, 426, and 428.

Figure 5:
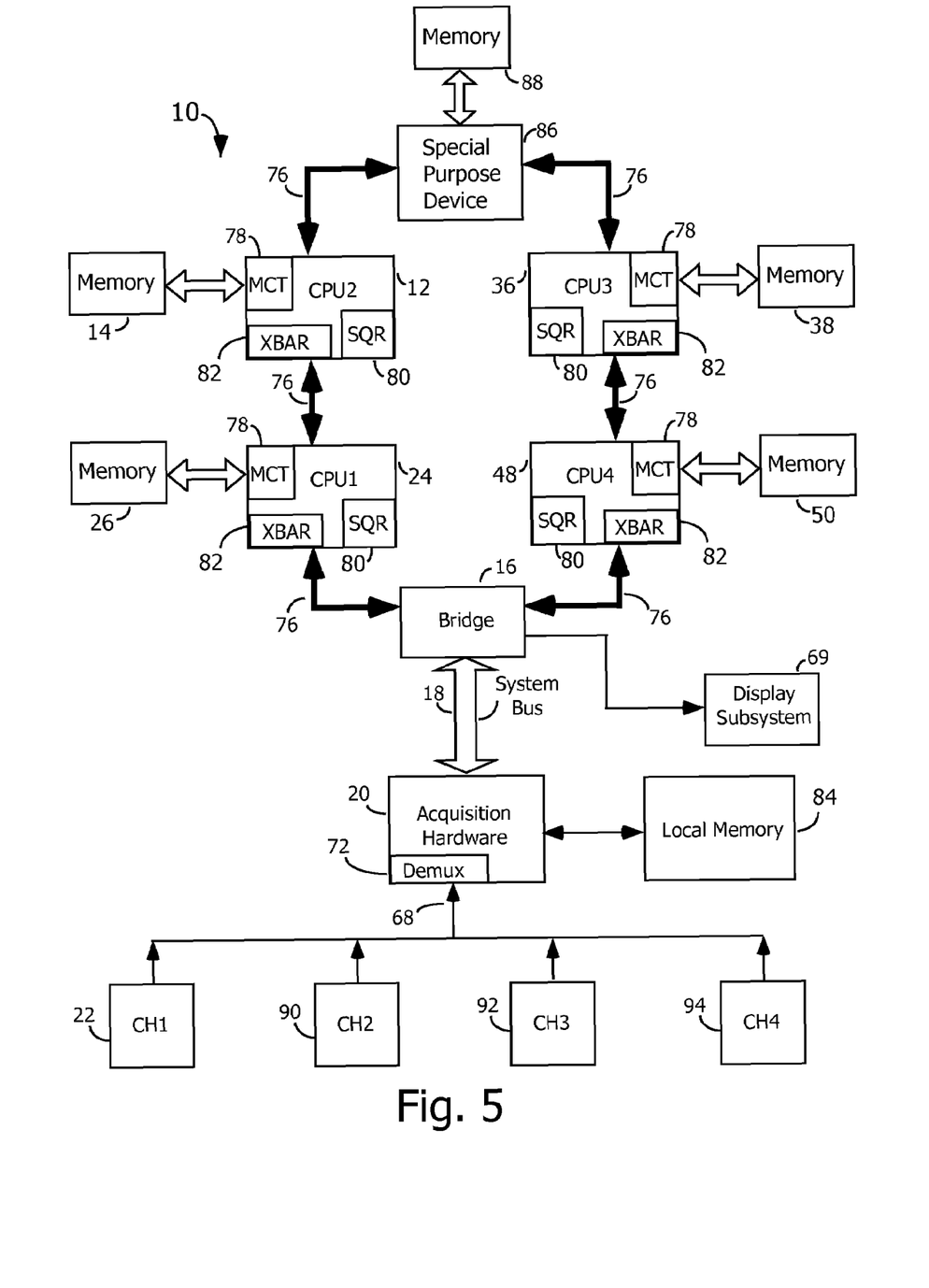
FIG. 5 is a block diagram view of the current embodiment of the apparatus and method for a test and measurement instrument constructed in accordance with the principles of the present invention.

FIG. 5 illustrates improved apparatus for a test and measurement instrument 10 of the present invention. More particularly, an architecture for the apparatus for a test and measurement instrument 10 is depicted, which is a circular processing queue architecture using multiple integrated circuits 12, 24, 36, 48 and 86, at least one of which is a specialized device.

In the current embodiment, integrated circuit 86 is a specialized device, but this should not be viewed as limiting. Acquisition module 20 collects data from oscilloscope channels 22, 90, 92, and 94 via a signal source bus 68. Acquisition module 20 has its own local memory 84 and a demux ring 72 that separates the collected data into separate records, each one containing at least one element of the original record. System bus 18 connects acquisition module 20 to bridge 16. Bridge 16 assigns the first record to the first integrated circuit 12 for processing. Integrated circuit 12 is connected to system memory 14.

System memory 14 stores incoming data from system bus 18 as well as intermediate and final calculations generated by integrated circuit 12. Once integrated circuit 12 has finished processing the first record, the result is passed to a second integrated circuit 24 with system memory 26 for additional processing, and a second record is assigned to the first integrated circuit 12 for processing.

If necessary, the last integrated circuit 48 can pass its result back to the first integrated circuit 12 for additional processing. Moreover, any of the integrated circuits 12, 24, 36, 48 and 86 can merely pass the result from the previous integrated circuit on to the next integrated circuit, which could be required if specialized processing is required by one of the integrated circuits 12, 24, 36, 48 and 86 having specialized capabilities (as will be discussed below).

Because of the circular nature of the integrated circuits' 12, 24, 36, 48 and 86 arrangement, the integrated circuits 12, 24, 36, 48 and 86 can be used to process any of the parts of the data in any desired order by passing the parts from one integrated circuit to another until the desired integrated circuit is reached. Once a final result is obtained, the last integrated circuit 48 makes the final result available for display by passing it to display 69 via bridge 16.

Each integrated circuit 12, 24, 36, 48 and 86 has its own local system memory 14, 26, 38, 50 and 88 for storing intermediate data. Each integrated circuit 12, 24, 36, 48 and 86 may have a separate channel assigned to it when data is acquired from multiple channels.

Each integrated circuit 12, 24, 36, 48 and 86 may be a general-purpose single or multicore CPU or a device with special capabilities, such as a Graphics Processing Unit (GPU), Digital Signal Processor (DSP), Field-programmable Gate Array (FPGA), or any other type of specialized device.

Each integrated circuit 12,24,36,48 and 86 may be programmable or non-programmable and may be analog, digital, or mixed signal. Any suitable method for dividing data into a series of parts for subsequent processing may be utilized in the present invention, as well as CPUs having any quantity of processor cores. Preferably, each integrated circuit is connected to the adjacent integrated circuits by high-speed interconnects 76 so that each integrated circuit can access the others' local memory.

The oscilloscope's operating system pulls all of the individual system memories into one global address space, distributes threads across the integrated circuits, and maps a thread's memory requests to local system memory or remote system memory. Local system memory refers to the memory directly connected to an integrated circuit, which can be accessed the fastest. Remote system memory refers to the memory directly connected to the other integrated circuits. While it can be accessed by the first integrated circuit, it takes longer. The global address space combines all of the individual system memories into a virtual single system memory accessible by the operating system. Threads enable a program to split itself into multiple simultaneously executing tasks. Multiple threads can be executed in parallel on many computer systems, such as those employed by the present invention.

In this architecture, the memory bottleneck of conventional SMP architectures is removed because each integrated circuit has its own memory controller 78, system request interface 80, and crossbar switch 82, so data remains in proximity to the integrated circuit that needs it. However, as shown in FIG. 5, each integrated circuit can access each of the other integrated circuits' memory using high-speed interconnects 76, enabling measurements that incorporate data from multiple memory locations. Furthermore, high-speed interconnects 76 can be used in place of system bus 18. The high-speed interconnects 76 enable much faster data transfer than does a conventional system bus, both because the high-speed interconnects 76 are inherently faster and because they are a dedicated data transfer resource instead of being shared.

In addition, the use of one or more specialized devices in addition to general-purpose CPUs can enable significant performance benefits for test and measurement instruments. Specialized devices are optimized for specific tasks, delivering very high performance for a limited set of applications, whereas general-purpose CPUs are generally less efficient in those applications. The presence of local memory for the specialized devices, as well as the ability to access other CPUs' memory, further enhances the specialized devices' performance of their particular tasks.

Figure 6:
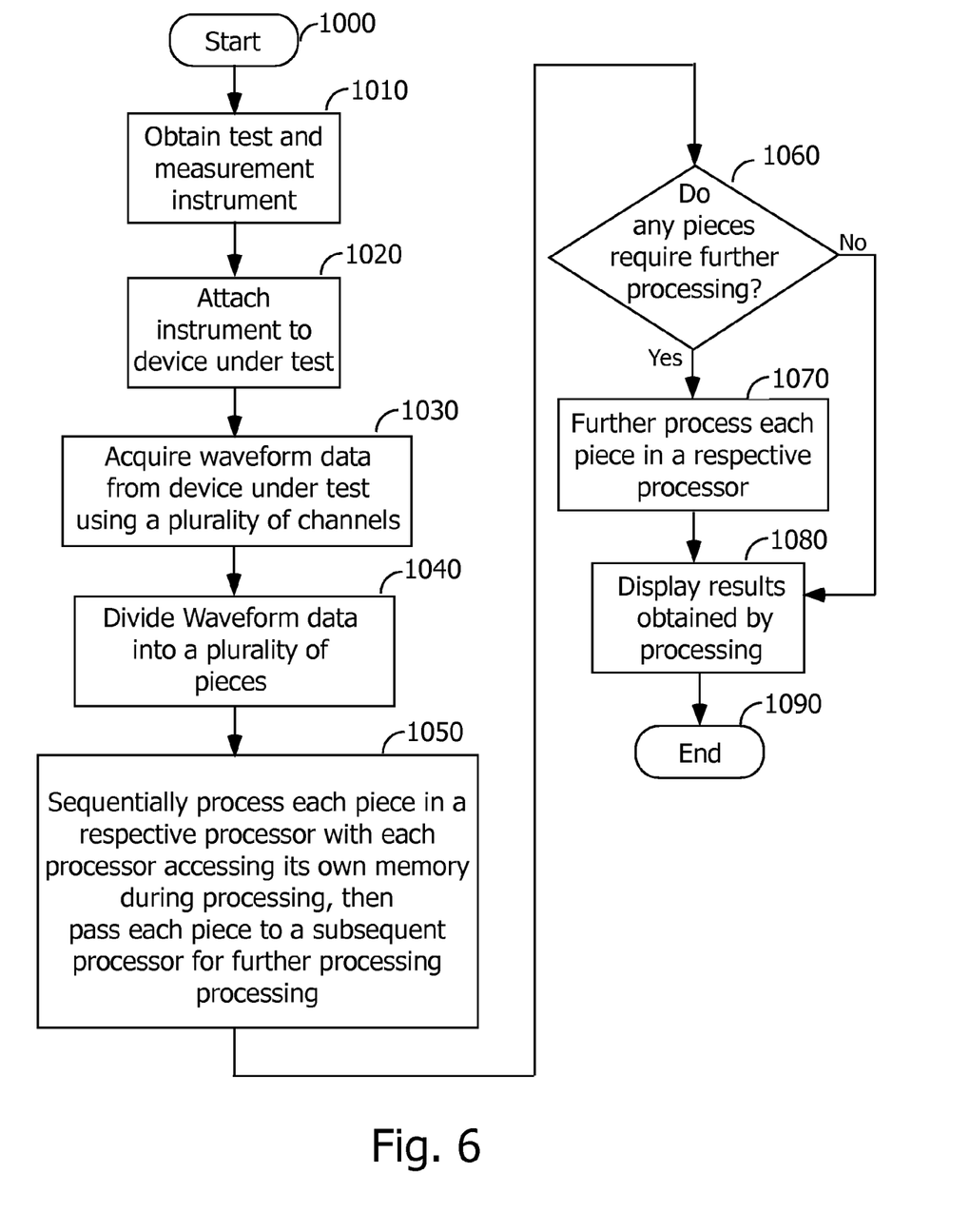
FIG. 6 is a flowchart view of a method of processing waveform data from multiple channels using a circular processing queue architecture of the present invention.

The invention also includes a method of processing waveform data from multiple channels using a circular processing queue architecture, which is depicted in FIG. 6. The method of processing waveform data from multiple channels using a circular processing queue architecture consists of the following steps: obtaining the test and measurement instrument using a circular processing queue architecture (1010); attaching the test and measurement instrument to a device under test (1020); acquiring waveform data from the device under test using a plurality of channels (1030); dividing the waveform data into a plurality of pieces (1040); sequentially processing each one of the plurality of pieces by a respective plurality of integrated circuits with each one of the plurality of integrated circuits accessing its own memory to process each piece prior to passing it along to a subsequent integrated circuit (1050); and displaying the results obtained by sequentially processing the plurality of pieces with the plurality of integrated circuits (1080). The method may also include further processing of at least one of the plurality of pieces by at least one of the plurality of integrated circuits following sequentially processing of at least one of the plurality of pieces by the plurality of integrated circuits (1060) and (1070).

While current embodiments of the apparatus and method for a test and measurement instrument have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable integrated circuit, such as Graphics Processing Units (GPUs), Digital Signal Processors (DSPs), and Field Programmable Gate-arrays (FPGAs), may be used instead of any of the general-purpose single or multicore CPUs described. And although providing a scalable test and measurement instrument capable of handling the acquisition, transfer, analysis, and display of large quantities of waveform data as well as complex waveforms has been described, it should be appreciated that the apparatus and method for a test and measurement instrument herein described are also suitable for use as a logic analyzer, real-time spectrum analyzer, or any other analytical instrument requiring multiple channels for data collection. In addition, the apparatus and methods of the current invention are also suitable for use in speech recognition applications. A single lengthy utterance by a user could be divided into multiple pieces, which would be distributed to multiple integrated circuits with their own memory for parallel processing. The circular processing queue architecture of the current invention could potentially improve accuracy as well as speed of speech recognition by enabling overlapping pieces of signal to be analyzed and compared based on the context of their surrounding words. Furthermore, any other suitable type of memory in addition to dynamic random access memory (DRAM) could be utilized.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for a test and measurement instrument, the instrument comprising:

a plurality of integrated circuits, including a first integrated circuit and a last integrated circuit, wherein at least one of the integrated circuits is a specialized device;

a plurality of memory controllers, wherein each integrated circuit is connected to its own memory controller;

a memory facility, wherein each memory controller is connected to its own memory;

a plurality of high-speed interconnects, wherein the integrated circuits are connected by the high-speed interconnects in a circular arrangement with each integrated circuit being directly connected to the integrated circuits immediately adjacent on either side;

a bridge, wherein at least the first and last integrated circuits are connected to the bridge;

a system bus, wherein the bridge is connected to the system bus;

an acquisition module having a signal bus interface and acquisition memory, wherein the system bus is connected to the acquisition module and has its own acquisition hardware, and wherein the acquisition hardware comprises a direct memory access machine that can transfer data to any portion of the memory; and a signal source, wherein the signal source is connected to the signal bus interface.

2. The apparatus for a test and measurement instrument as defined in claim 1, wherein the high-speed interconnects are used as the system bus.

3. The apparatus for a test and measurement instrument as defined in claim 1, wherein the specialized device is selected from the group comprising graphics processing units, digital signal processors, and field-programmable gate arrays.

4. The apparatus for a test and measurement instrument as defined in claim 1, wherein each integrated circuit is connected to its own memory element.

5. The apparatus for a test and measurement instrument as defined in claim 4, wherein the memory elements are interconnected.

6. The apparatus for a test and measurement instrument as defined in claim 4, wherein each memory element is interconnected to at least another of the memory elements by way of the integrated circuit to which it is connected.

7. The apparatus for a test and measurement instrument as defined in claim 1, wherein at least one of the integrated circuits is a multicore processor.

8. The apparatus for a test and measurement instrument as defined in claim 1, including a display connected to at least the last integrated circuit for displaying images based on signals acquired by the instrument.

9. The apparatus for a test and measurement instrument as defined in claim 1, wherein the display is connected to at least the last integrated circuit by way of the bridge.

10. A method of processing waveform data from one or more channels using a circular processing queue architecture comprising the steps of:
   a) providing the test and measurement instrument as defined in claim 1;
   b) attaching the test and measurement instrument to a Device Under Test (DUT) to be measured, wherein the signal source is in electronic communication with the acquisition module;
   c) collecting data from the DUT;
   d) storing the collected data from the DUT in the acquisition memory;
   e) dividing the collected data from the DUT into a plurality of pieces;
   f) assigning one of the plurality of pieces to be processed next;
   g) transferring the piece to be processed next to the memory connected to the first integrated circuit;
   h) processing any pieces to be processed by each integrated circuit communicating with its own memory to generate intermediate results;
   i) transferring each intermediate result from the integrated circuit generating it to the adjacent integrated circuit;
   j) repeating steps e) through i) until all of the plurality of pieces created in step d) have been processed at least once by the final integrated circuit and the final integrated circuit's memory contains a final result; and
   k) reporting the final result to a user.

11. The method of processing waveform data from one or more channels using a circular processing queue architecture as defined in claim 10, wherein the high-speed interconnects are used as the system bus.

12. The method of processing waveform data from one or more channels using a circular processing queue architecture as defined in claim 10, wherein the specialized device is selected from the group comprising graphics processing units, digital signal processors, and field-programmable gate arrays.

13. The method of processing waveform data from one or more channels using a circular processing queue architecture as defined in claim 10, wherein each integrated circuit is connected to its own memory element.

14. The method of processing waveform data from one or more channels using a circular processing queue architecture as defined in claim 10, wherein the memory elements are interconnected.

15. The method of processing waveform data from one or more channels using a circular processing queue architecture as defined in claim 10, wherein each memory element is interconnected to at least another of the memory elements by way of the integrated circuit to which it is connected.

16. The method of processing waveform data from one or more channels using a circular processing queue architecture as defined in claim 10, wherein at least one of the integrated circuits is a multicore processor.

17. The method of processing waveform data from one or more channels using a circular processing queue architecture as defined in claim 10, including a display connected to at least the last integrated circuit for displaying images based on signals acquired by the instrument.

18. The method of processing waveform data from one or more channels using a circular processing queue architecture as defined in claim 10, wherein the display is connected to at least the last integrated circuit by way of the bridge.

* * * * *